May 3, 1938.  S. ROSENZWEIG  2,116,042
VIBRATION DAMPER
Filed July 22, 1936  2 Sheets-Sheet 1
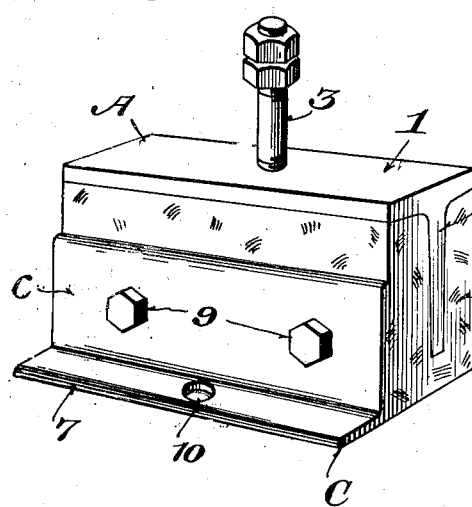
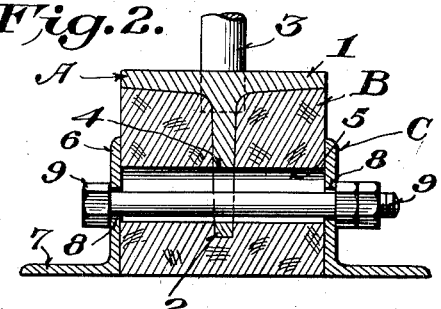
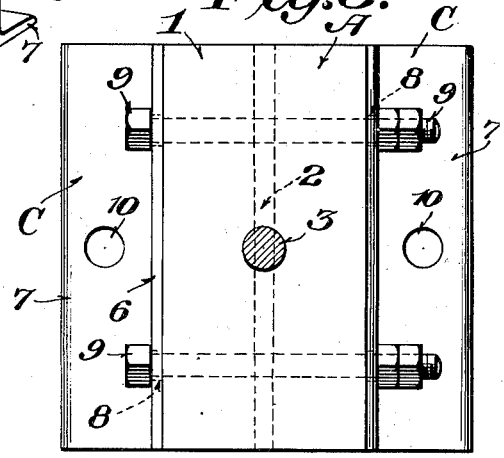
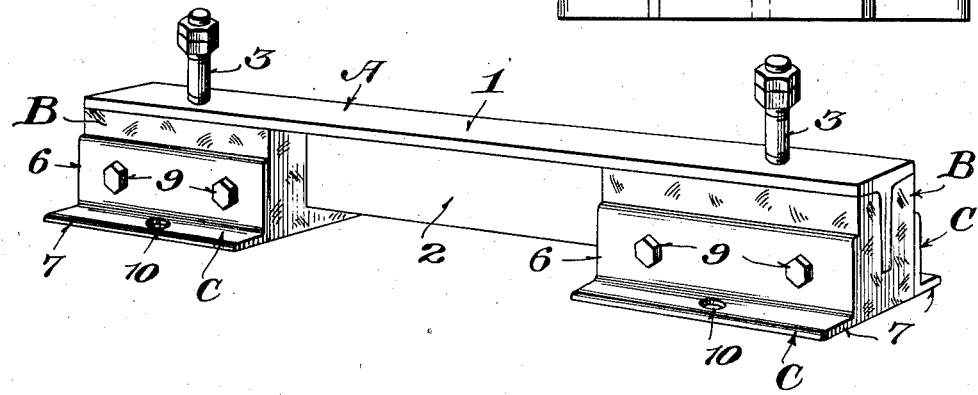
Inventor
S. Rosenzweig,
By D. P. Wolcha...
Attorney May 3, 1938.  S. ROSENZWEIG  2,116,042
VIBRATION DAMPER
Filed July 22, 1936  2 Sheets-Sheet 2
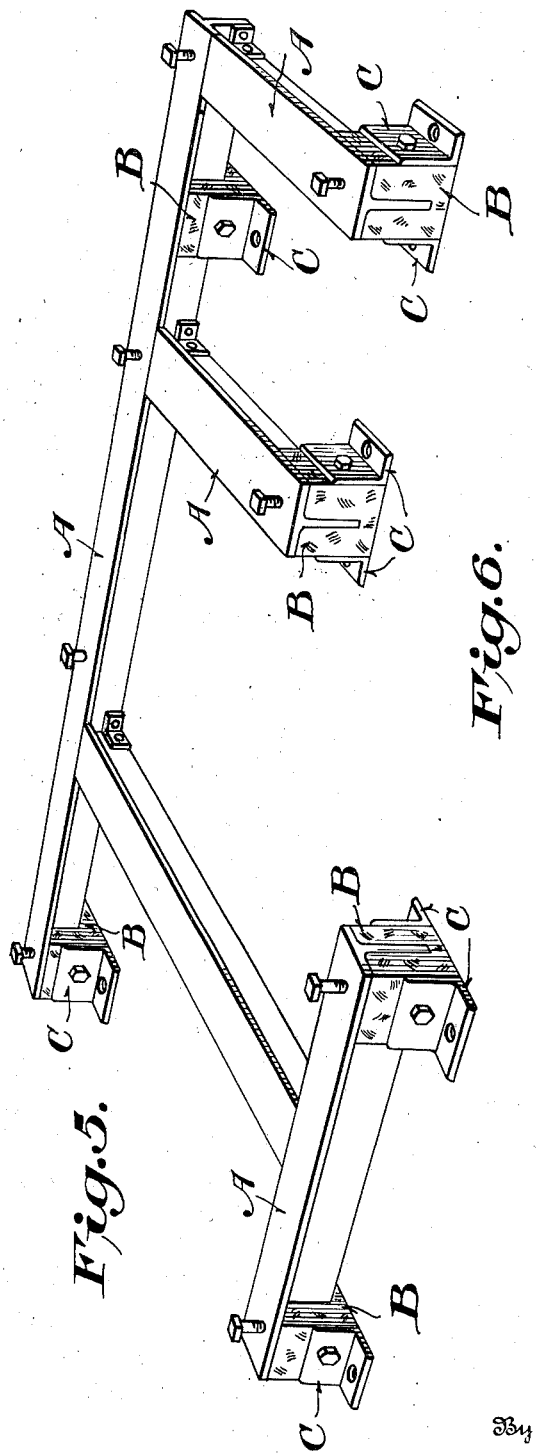
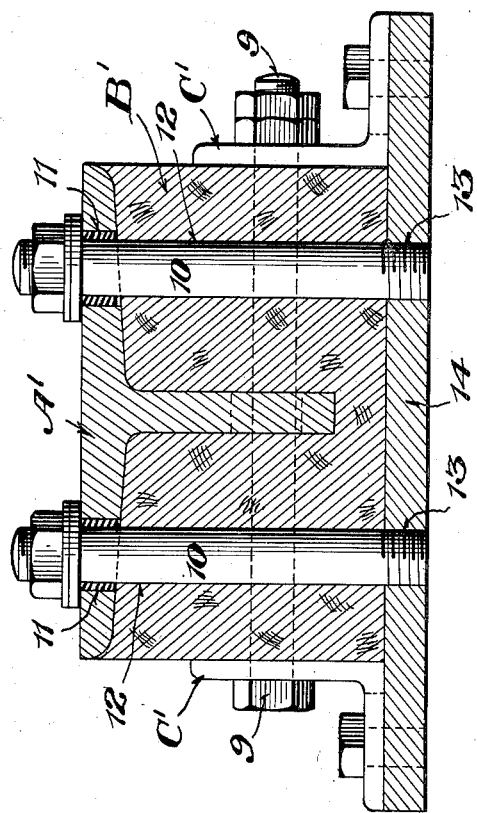
Inventor
S. Rosenzweig,
By
Attorney Patented May 3, 1938

2,116,042

UNITED STATES PATENT OFFICE 2,116,042

VIBRATION DAMPER

Siegfried Rosenzweig, Long Island City, N. Y.

Application July 22, 1936, Serial No. 92,021

7 Claims. (Cl. 248—22)

This invention relates to vibration dampers, and more particularly to a sturdy and compact unit affording satisfactory yet inexpensive isolation for light machinery.

While it has been heretofore proposed to mount a machine support on springs or organic material such as cork, nevertheless, particularly in the use of cork or similar isolation material little or no provision has been made for obtaining the desired pre-compression of the isolating element in accordance with the demands of a particular isolation. Isolating material must be properly loaded by the weight of the machine before it becomes an effective isolator under the impact of operation. With certain light-weight machinery sufficient loading for proper isolation requires such a restricted area of natural cork as to make its isolation impractical.

Accordingly, the present invention has primarily in view the provision of a construction based upon exact machine weights and impact loading figures and which is so assembled that the natural cork or other isolating material will be acting under its peak efficiency when installed. In that connection the invention contemplates the use of a machinery support having a portion seated in a chair of isolating material and which chair is embraced by supporting end compression elements which may be drawn together to permit of the desired precompression of the isolating material and adjustment after the machine has been installed.

A further object of the invention is to utilize more or less standard structural shapes in combination with a chair of cork or other isolating material which permits an economy in manufacture and simplicity of installation and facility of adjustment.

With the above and other objects in view which will more readily appear as the nature of the invention is better understood, the same consists in the novel construction, combination, and arrangement of parts hereinafter more fully described, illustrated and claimed.

A preferred and practical embodiment of the invention is shown in the accompanying drawings, in which, Fig. 1 is a perspective view of a unit constructed in accordance with the present invention.

Fig. 2 is a vertical cross-sectional view of the construction shown in Fig. 1.

Fig. 3, top plane view.

Fig. 4 is a perspective view illustrating the use of the unit shown in Fig. 1 in tandem.

Fig. 5 is a view illustrating the wide range of application of the present construction.

Fig. 6 is a vertical cross sectional view of a modified form of construction.

Similar reference characters designate corresponding parts throughout the several figures of the drawings.

Referring to Fig. 1 it will be observed that the invention includes in its organization a machine support designated generally as A and preferably having the cross-sectional shape of a T-iron including a head 1 and a shank or web 2 depending medially therefrom. The support A may be provided with a machine anchoring bolt or fastening 3 to secure the superimposed apparatus in position thereon.

The web portion 2 of the support A is provided with one or more openings 4 (Figs. 2 and 3) and is intended to be seated in a chair of isolating material B. As shown in the drawings, the chair B is preferably of cork or equivalent material and is cut away at its central portion to receive the web 2. The body of the chair is preferably provided with openings 5 registering with the openings 4 in the web, and at the opposite sides of the body there is provided suitable compression elements C—C.

The compression elements C are preferably in the form of angle irons having the upstanding or vertical flange 6 and the horizontal flange 7. The vertical flanges 6 are provided with bolt receiving openings 8 for accommodating suitable bolts 9 of less diameter than the openings 4 and 5 respectively in the web 2 and the chair B. The flanges 7 of the angle bars may be provided with fastening receiving openings 10 to permit of the entire assembly being bolted or otherwise secured to the floor after the compression elements C—C have been properly adjusted.

It will be observed that the entire arrangement is such that there is no metal to metal contact between any of the parts. In practice the compression members C—C may be initially set in the floor or other support to give the cork the desired precompression or they may be drawn together by the bolts 9 to compress the isolating material of the chair C. In either event the cork is compressed to the desired degree to give the natural cork or other isolating material peak efficiency for vibration damping. When using the bolts 9 the assembly is adjusted to suit the particular isolation requirements and the entire assembly may then be secured to the floor or base as above indicated.

The T-iron which constitutes the machine support A may be made of any length and the isolation chairs may also be made in lengths to suit each requirement. For example, the T-irons may be arranged in parallel and connected by a suitable cross member as shown in Fig. 5 or they may be made in short lengths laid at right angles to an iron constituting one of the major supports. In every instance, however, each iron rests in an isolation chair of the type heretofore set forth. Several dampers can be joined by extension of the T-iron for better load distribution. Each damper can be made in any length and width to suit loading requirements.

Accordingly, it will be understood that the machine supports or T-irons or bars may be readily made into the required units from pre-formed stock lengths, and, likewise the isolation chairs may be cut into the desired lengths from pre-formed stock sections. Thus, the present construction makes it possible to mount a number of units in any fashion to provide a base which will take care of alignment of the different units as well as to provide a machine support or base to take up side thrust due to belt drives and the like.

Fig. 6 of the drawings illustrates a modification wherein vertical compression bolts may be used. These bolts 10, or their equivalent pass through suitable openings 11 in the horizontal flanges of the T-iron or machine support A' and likewise pass through the openings 12 provided in the isolating chair B'. The lower ends of the bolts 10 are threaded to fit into threaded sockets 13 in a base plate 14. Thus, by tightening the bolts 10 the isolation chair B' may be compressed vertically. As shown, the horizontal bolts 9a may also be used to draw the compression elements C' together to compress the material of the isolation chair horizontally. Through the use of the base plate 14 and the vertical bolts 13 the members A' and B' may be assembled for shipment without the horizontal bolts 9. In the latter case the bolts 9 and compression bars C would be assembled at the time of installation.

From the foregoing it will be apparent that the distinctive feature of the present invention resides in mounting a machine support on an isolating base or chair which may be precompressed to the desired degree by applying any suitable clamping or compressing means to the plates C—C as, for example, by tightening the bolts 9 prior to the compression elements being permanently fixed to the floor or base, thereby enabling the construction to meet any given installation requirement. Also, the isolation chair may be compressed vertically. Therefore, the present invention provides for the use of vertically arranged compression elements (C—C) or horizontally arranged compression elements (A' and 14) to give the cork the desired precompression.

Without further description it is thought that the features and advantages of the invention will be readily apparent to those skilled in the art, and it will, of course, be understood that changes may be resorted to within the scope of the appended claims.

I claim:—

1. A vibration damper including a T-iron machine support, isolating means engaging the web and underside of the head of the T-iron, oppositely arranged angle-irons whose upright flanges engage the isolating means while the horizontal flanges rest on the floor and bolts for drawing the angle-irons together to compress the isolating means.

2. A vibration damper including a T-iron machine support, isolating means embracing the vertical web and contacting with the underside of the head of the T-iron oppositely arranged angle-irons whose upright flanges are of less height than the isolating means and engage therewith below the head of the T-iron, and bolts for drawing the angle-irons together to pre-compress the isolating means.

3. Vibration damping means comprising a body of resilient material, a support on which said body is seated at its bottom, a machine supporting element resting upon the top of said body and having a flange extending downwardly into said body, plates disposed against opposite sides of said body, and bolts extending through said plates and said body for drawing the plates against said body to compress the same, said bolts extending through said flange to hold the machine supporting element and the plates and the resilient body in assembly with each other.

4. Vibration damping means comprising a body of resilient material to have one end thereof seated against a support, a machine supporting element seated against the opposite end of said body and having a flange extending into said body, plates disposed against opposite sides of said body, and bolts extending through said plates and said body for drawing the plates against said body to compress the same, said bolts extending through said flange to hold the machine supporting element and the plates and said body in assembly with each other.

5. Vibration damping means comprising a body of resilient material, a support on which said body is seated at its bottom, a machine supporting element including vertical and horizontal portions, the latter resting upon the top of said body and the former being embedded in the said body, adjustable means for horizontally compressing said body, and adjustable means for vertically compressing said body.

6. Vibration damping means adapted to be fabricated to meet predetermined loading requirements comprising a machine supporting frame including a series of continuous T-irons disposed in spaced angular relation and arranged so that the horizontal parts thereof constitute a machine supporting base, and a plurality of isolating chairs adapted to rest on the floor or the like for embracing and supporting the vertical portions of said irons at spaced intervals.

7. Vibration damping means including, in combination, a machine supporting frame comprising a plurality of continuous inter-connected frame elements each including vertical and horizontal portions, and a plurality of damping chairs including isolation material for embracing the vertical portions of said frame elements and for supporting the horizontal portions, said chairs being arranged at spaced intervals beneath the frame to support the same.

SIEGFRIED ROSENZWEIG.